United States Patent
Adams et al.

(10) Patent No.: US 6,931,408 B2
(45) Date of Patent: Aug. 16, 2005

(54) METHOD OF STORING, MAINTAINING AND DISTRIBUTING COMPUTER INTELLIGIBLE ELECTRONIC DATA

(75) Inventors: Steven E. Adams, Dublin, OH (US); Steven R. Zimmerman, Columbus, OH (US); James R. Davee, Clayton, OH (US); Fouzia S. Kiani, Grove City, OH (US)

(73) Assignee: E.C. Outlook, Inc.

( * ) Notice: Subject to any disclaimer, the term of this patent is extended or adjusted under 35 U.S.C. 154(b) by 377 days.

(21) Appl. No.: 09/938,973

(22) Filed: Aug. 24, 2001

(65) Prior Publication Data

US 2003/0037037 A1 Feb. 20, 2003

Related U.S. Application Data (60) Provisional application No. 60/312,974, filed on Aug. 17, 2001.

(51) Int. Cl.$^7$ .............................................. G06F 17/30
(52) U.S. Cl. .................................... 707/100; 707/104.1
(58) Field of Search .......................... 707/1–6, 10, 100, 707/104.1, 200

(56) References Cited

U.S. PATENT DOCUMENTS

| | | | |
|---|---|---|---|
| 5,161,224 A | 11/1992 | Tsutsumitake | |
| 5,237,497 A | 8/1993 | Sitarski | |
| 5,551,028 A | 8/1996 | Voll et al. | |
| 5,682,524 A | * 10/1997 | Freund et al. ................ | 711/5 |
| 5,706,455 A | 1/1998 | Benton et al. | |
| 5,734,886 A | 3/1998 | Grosse et al. | |
| 5,752,021 A | 5/1998 | Nakatsuyama et al. | |
| 5,768,581 A | 6/1998 | Cochran | |
| 5,794,246 A | * 8/1998 | Sankaran et al. ........... | 707/101 |
| 5,809,497 A | * 9/1998 | Freund et al. ................ | 707/2 |
| 5,857,184 A | 1/1999 | Lynch | |
| 5,918,229 A | 6/1999 | Davis et al. | |
| 5,956,711 A | 9/1999 | Sullivan et al. | |
| 5,995,979 A | 11/1999 | Cochran | |
| 6,014,670 A | * 1/2000 | Zamanian et al. .......... | 707/101 |
| 6,018,342 A | 1/2000 | Bristor | |
| 6,055,538 A | 4/2000 | Kessenich et al. | |
| 6,092,080 A | 7/2000 | Gustman | |
| 6,151,601 A | * 11/2000 | Papierniak et al. ............ | 707/10 |
| 6,163,781 A | 12/2000 | Wess, Jr. | |
| 6,175,830 B1 | 1/2001 | Maynard | |
| 6,216,131 B1 | 4/2001 | Liu et al. | |
| 6,560,620 B1 | * 5/2003 | Ching ........................ | 715/511 |
| 6,658,626 B1 | * 12/2003 | Aiken ........................ | 715/526 |
| 2002/0055932 A1 | * 5/2002 | Wheeler et al. | |
| 2003/0033275 A1 | * 2/2003 | Alpha et al. .................... | 707/1 |

* cited by examiner

Primary Examiner—Greta Robinson
Assistant Examiner—Debbie M. Le
(74) Attorney, Agent, or Firm—Jackson Walker, L.L.P.

(57) ABSTRACT

The present invention provides an improved method of storing, maintaining, and distributing computer intelligible electronic data that substantially reduces the cost and complexity of traditional database management systems. The present invention provides a unstructured database capable of efficiently accessing and storing electronic data, regardless of the data's structure. Instead of slotting incoming data into a predefined rigid storage structure, the present invention analyzes the inherent structure of the incoming data. Based upon the results of this analysis, the unstructured database of the present invention generates a storage model using tokenized symbology representing the inherent structure of the data. The tokenized symbology of the present invention is utilized to provide immediate access to each data field in a given record. The present invention utilizes logical and positional pointers to allow entire records associated with any data field to be generated without the need for additional search queries.

6 Claims, 6 Drawing Sheets

METHOD OF STORING, MAINTAINING AND DISTRIBUTING COMPUTER INTELLIGIBLE ELECTRONIC DATA

This patent application claims priority from provisional patent application entitled SYSTEM AND METHOD FOR COLLECTING, MAINTAINING, AND DISTRIBUTING ELECTRONIC DATA, Ser. No. 60/312,974, having a filing date of Aug. 17, 2001.

FIELD OF THE INVENTION

This invention relates generally to an electronic data management system and more particularly to a method of collecting, maintaining, and distributing electronic data.

BACKGROUND OF THE INVENTION

The collection, maintenance, and distribution of electronic data is typically performed by a database management system (DBMS). Storage of data, be it paper, punch card, or electronic, is typically premised on the goal of providing fast and accurate retrieval of electronic data, i.e. distribution. The ability of the DBMS to collect and maintain electronic data heavily influences its potential to provide fast and accurate retrieval. In short, if errors are made in the design of the database, the ability of the database to provide fast and accurate retrieval of electronic data is hampered. To illustrate, an index card cabinet designed to store 3" by 5" index cards will be ineffective in storing data maintained on 4"×6" index cards. Thus, quick and accurate retrieval of data is prevented due to the improper collection (the card size) and maintenance (the card cabinet) of the system.

The traditional DBMS requires a measure of rigidity in its initial design. This rigidity is imposed upon the incoming data using the DBMS structure. The rigid structure provides a reference set of information containing data element names, sizes, characteristics, etc., hereinafter referred to as metadata.

The Column/Row model is a classic example of the metadata rigidity seen with the traditional DBMS. In this model, each row represents a single "record" of information, while each column represents a specific piece (i.e. "field") of data for that record. To illustrate, a database of homeowners could have columns for NAME, ADDRESS, CITY, STATE, and ZIPCODE fields for each record. The result is a Column/Row model that allows for basic isolation of specific fields through the unique Column/Row coordinate point, where Column 1, Row 1 contains the NAME field of the first record's homeowner data.

While the rigidity of a predefined DBMS structure provides unique coordinate points for all fields in all records, there is a price to be paid, namely, flexibility. Using the Homeowner Database example above, the single field NAME may be insufficient for some uses, such as identification of last name, first name, or middle initial. Since there is only one NAME field, no unique column exists for these sub values of a homeowner's name, such that this information must be stored in the single NAME field. While the last name data could be extracted from the NAME field, additional effort is required to do so, producing inconsistent results especially if the data in the NAME field is not entered the same manner for each record (i.e. last name first, first name last). The additional effort required to identify the data and the potential for inconsistent results makes the traditional DBMS unable to supply fast and accurate retrieval of electronic data under certain circumstances.

Referring to the homeowner example, a DBMS designed without a column for entry of phone number data will result in the loss of efficiency. Specifically, without a phone number column in the database, phone number data cannot be stored unless it is stored in one of the existing fields, thus breaking the logic of that column's data identification.

Traditional database management systems are capable of increasing searching speed by placing data into specifically ordered lists of fields or field combinations within the database, commonly known as indexes. As new records are added, these indexes must be updated to insert the new data into the ordered sequence.

Indexes may be predefined during the initial design of the DBMS's rigid structure or created on demand. Unfortunately, traditional indexes require large amounts of storage space for creation and maintenance due to the duplication of data elements that are subject to the index. Like the data structure, indexes are designed to conform with anticipated user requests for data retrieval. Accordingly, traditional DBMS indexes are not created for non-anticipated requests. Referring to the homeowner example, a database designer would not predefine an index for the address field because this field is likely to contain duplicate street names and numbers. More likely, a database designer will predefine an index for the name field because this field is more likely to contain non-duplicate data. As a result, a user searching for an address data field will be forced to endure a row-by-row search without the assistance of an index.

The rigid structure of the traditional DBMS imposes restrictions on the size and type of data that can be stored in each field. Referring to the Homeowner example, if the NAME field is defined as being 25 alphabetic characters in length, any name longer than 25 characters would be truncated, and a hyphenated name may not be stored at all since the hyphen is not within the alphabetic character set. Some DBMS systems allow for some variability in a field's metadata value for size should it be defined for that purpose, but only as character information. Numeric, date or time values cannot be stored in these variably sized fields and still retain their numeric, date, or time characteristics.

There remains a need for an improved database management system capable of importing data of any type, analyzing the data, supplying metadata information, searching the database contents, and retrieving data fields, records, or entire original data files.

SUMMARY OF THE INVENTION

Accordingly, the present invention provides an improved method of storing, maintaining, and distributing computer intelligible electronic data that substantially reduces the cost and complexity of traditional Database Management Systems. The present invention enables the user to import data of any type, analyze the contents, supply metadata information as required, search the database contents, and retrieve specific data fields, records, or the entire original data file.

The present invention provides an unstructured database capable of efficiently accessing and storing electronic data, regardless of the data's structure. Instead of slotting incoming data into a predefined rigid storage structure, the present invention analyzes the inherent structure of the incoming data. Based upon the results of this analysis, the unstructured database of the present invention generates a storage model capable of efficiently storing the incoming data.

Incoming data is assigned one or more tokenized symbols denoting the inherent structure of the data. The internal storage device of the unstructured database is then searched to reveal whether the database already contains data having the same or similar structure, i.e., data having the same or similar tokenized symbology. If a suitable match is found, the incoming data is stored along with the matching stored data having similar metadata characteristics. If no match is found, the present invention creates a storage model to match the metadata characteristics of the incoming data, which is then replicated within the database.

The present invention automatically creates a collection of one or more tokenized symbols representing the field, record and file of the incoming data for which a unique storage model is created. These collections of tokenized symbols, referred to as lenses, are utilized by the present invention during query, retrieval and data extraction processes to further enhance the efficiency of the unstructured database of the present invention.

The tokenized symbology of the present invention is utilized to provide immediate access to each data field in a given record. The field-to-record cyclical storage feature of the present invention uses tokenized symbology containing logical and positional pointers. The pointers used by the present invention are designed to allow the entire record associated with any data field to be generated without having to conduct additional searches.

The unstructured database of the present invention allows search queries in a variety of languages. The present invention is capable of translating user search queries into the applicable tokenized symbology such that the system may conduct searches for matching symbology. The present invention also allows individual users to define additional languages for subsequent translation into the applicable tokenized symbology.

DETAILED DESCRIPTION OF THE INVENTION

Referring to the Figures, the present invention is herein described as a method of storing, maintaining, and distributing computer intelligible electronic data and as a computer readable medium comprising a plurality of instructions for storing, maintaining and distributing computer intelligible electronic data which, when read by a computer having a database capable of storing one or more electronic records, causes the computer to perform a series of steps.

Figure 1:
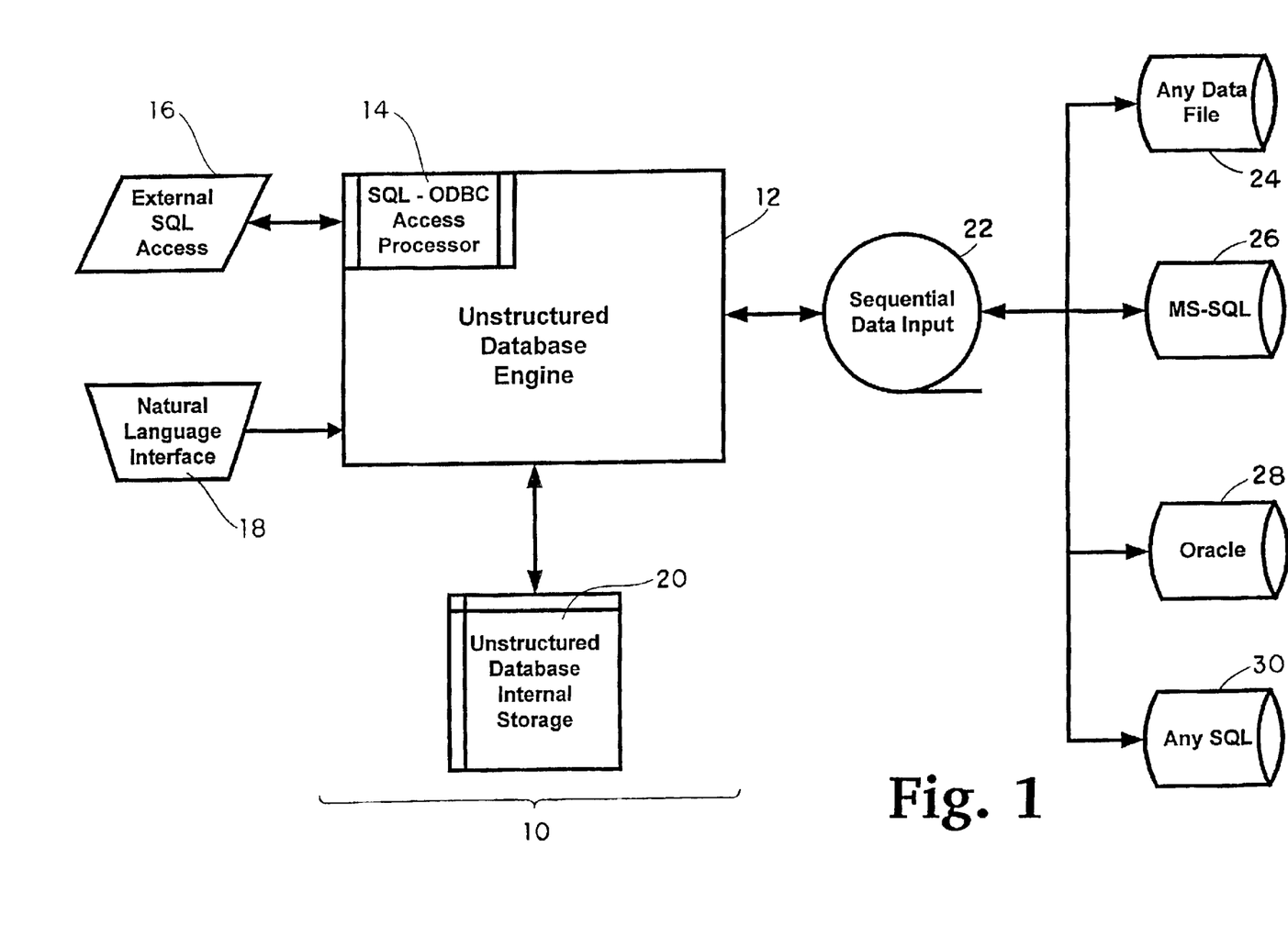
FIG. 1 is a flowchart illustrating one embodiment of the unstructured database of the present invention.

Referring to FIG. 1, the present invention uses an unstructured database (10) capable of storing, maintaining and distributing computer intelligible electronic data. The unstructured database of the present invention is equipped with a database engine (12) having a SQL-ODBC access processor (14) capable of bidirectional communication with a variety of external systems (16).

In one embodiment, external systems (16), including those utilizing SQL, are indirectly connected to the unstructured database engine (12) via the SQL-ODBC processor (14). In another embodiment of the present invention, a natural language interface (18) is used to provide external access to the unstructured database (10). The natural language interface (18) allows users to access the unstructured database (10) of the present invention without formulating SQL queries. Specifically, users may enter natural language queries such as "What is the zip code for John Doe?" without first converting the query into a computer intelligible language.

The unstructured database engine (12) of the present invention is electrically connected to an internal storage device (20). In one embodiment, the internal storage device (20) of the present invention is used to store electronic data accessed by the unstructured database (10).

The sequential data input (22) portion of FIG. 1 illustrates the unique data importation technique used by the present invention. Unlike traditional database management systems, the present invention is not restricted to a predefined input data structure. Instead, the present invention is capable of receiving electronic data, regardless of its metadata. Once received, the electronic data is analyzed to determine the appropriate storage location within the database (10), as described in detail below. Blocks (24, 26, 28, and 30) provide further illustration of the ability of the unstructured database (10) of the present invention to access and process electronic data regardless of the data's structure.

The unstructured database (10) of the present invention is highly versatile and may be used with a variety of hardware platforms. For example, the present invention may be used with a host of personal computers and mid-range computer platforms (not shown). Platform specific code may be generated for Windows, Solaris, Linux, and Hewlett Packard HP-UX operating systems. Other platform specific code may be developed for various other operating systems, if desired.

Any media type or environment supported by the operating system and hardware platform, whether local to the system or over a network, may be used to store the elements of the Unstructured Database (10). For example, direct access storage devices (DASD), write-once read-many devices (WORM), directly accessible tape and solid state drives (SSD), single or multiple read/write head, redundant array (RAID of any level), or jukebox subsystems may be utilized by the present invention. The present invention is capable of efficient operation without the use of proprietary media formats, hidden partitions, or any other storage media preparation in addition to that required and/or supported by the operating system and hardware platform on which the unstructured database (10) is installed.

The present invention is capable of efficiently collecting data regardless of the data's source or structure. In one embodiment of the present invention, the term "data" is used to describe actual characters or values such as a name (e.g. John Smith) or date (e.g. May 7, 2001) stored in a computer intelligible format. In another embodiment, data is accumulated into files. Files may take the form of a computer data file, a computer application, or any data input stream or data collection introduced from an outside application or system. These files may be divided into records comprising a physical or logical division of the file into one or more sets of characters. In another embodiment, individual elements of data retaining some characteristic or value in addition to their simple character contents are referred to as a field. For example, "2001" could be classified by value, year, and/or street number fields, depending upon its intended use.

Data is classified into the unstructured database (10) according to its inherent structure, or metadata. In one embodiment, metadata is determined by analyzing the syntactic and semantic characteristics of the incoming data. In one embodiment, syntax refers to the physical characteristics of a field, record or file. For example, if a given field contains the Data "2001", syntax metadata would include a length of four characters of the Numeric type. Syntax metadata may also include the field's position within the record as compared to other fields as well as the number of fields in a record, the accumulated character lengths of each field, and the record's position with the file as compared to other records. Additionally, syntax may include the overall file size, the creation date. the last-modified date, and the number of records in the file. Syntax metadata may also used as the validation test for field data, as discussed below.

In one embodiment, semantics refer to the attribute characteristic values of a field, record, or file. For example, if a given field contains the data "2001", semantic metadata may take the form of a "year" definition to describe the data. Semantic metadata may also include definitions such as "Ordered Items" or "Shipping Information", depending on the type of data at issue. For any given file, semantic metadata may include broad definitions such as "Company A Purchase Order" or "XML Transaction Database". Semantic metadata is typically provided by the user upon creation of the Field, Record, or File at issue.

Data Manipulation

Rigid structures of "n" dimensions are required for traditional DBMS systems to store collected data. These rigid structures are designed to identify fields of data for each stored record. However, this rigid structure limits the availability of data output information, since data that has not been previously stored cannot be retrieved. Accordingly, these rigid structures typically limit the speed and accuracy of data retrieval especially when the request for data elements does not match the rigid structure.

Rigid structures impose metadata upon the incoming data that must match for the data to be stored (i.e. Alphabetic characters cannot be stored in a field designated as a Numeric type). Accordingly, field size characteristics used with traditional databases limit the available data input to be equal to or less than the size of the predefined rigid field, with extra characters being truncated.

Figure 2:
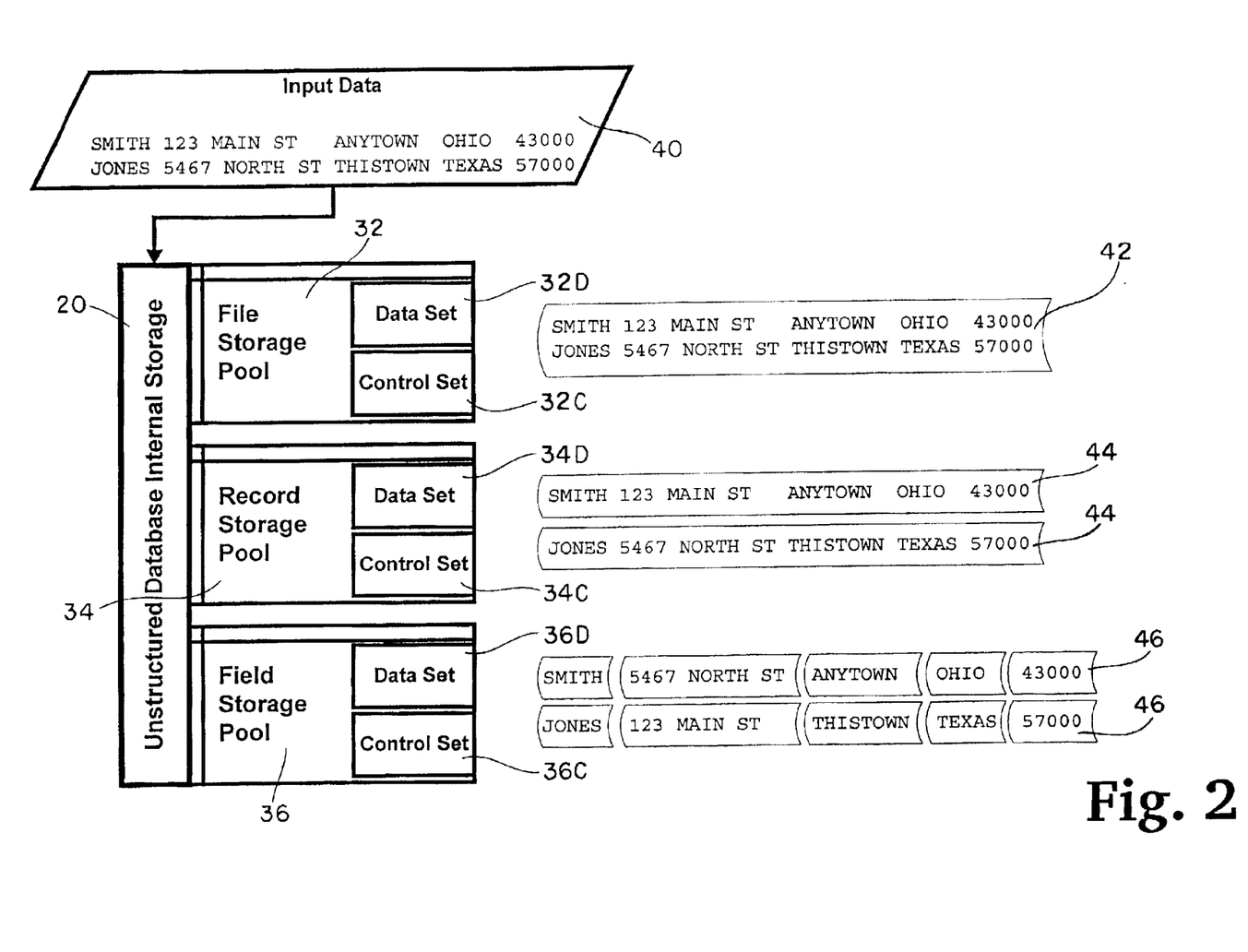
FIG. 2 is a flowchart illustrating the logical arrangement of storage data pools in one embodiment of the present invention.

Referring to FIG. 2, the present invention does not predefine a rigid structure of any dimensions into which collected data is to be placed. Instead, the incoming data is analyzed to determine its inherent structure, to which the database (10) of the present invention adjusts its data storage methods to allow unique identification of the fields for each stored record. This present invention allows identification of data elements and enables requests for data retrieval including but not limited to a full regeneration of the original input data source. FIG. 2 illustrates an incoming data file (40) having two records each containing name and address data. The file is sequentially read into the database (10) where semantic metadata is automatically generated and stored in various storage pools, as described further below.

The present invention allows for typeless data storage such that rigid metadata characteristics are not imposed upon the incoming data (40). Although metadata is utilized in this invention to define appropriate field elements, it is not used to restrict data importation. Accordingly, field elements that do not match the metadata for the field can be isolated and corrected without an imposition on its initial collection.

Data Access

Data to be stored within the database (10) of the present invention is collected via an input process. Data may be physically imported into the database (10) or simply accessed and utilized as an external data source.

The use of an unstructured database (10) allows the present invention to efficiently access and store electronic data regardless of the data's source or structure. For example, data having an explicit structure (i.e., database, XML, or other "tagged" formats) is analyzed such that the unstructured database (10) of the present invention may create an appropriate storage model. For structured data, the present invention creates a matching metadata structure within the internal storage device (20) of the database (10) such that it may be replicated therein. As described below, this is accomplished through the use of tokenized symbology capable of describing the metadata characteristics of the incoming data.

Structured data sources provide syntactical and semantic metadata through the inherent structure in the representation and storage of the data. Accordingly, a very high percentage of the syntactical and semantic metadata for structured input data is automatically captured and utilized by the present invention.

In addition to structured data, the present invention is capable of accessing and storing semi-structured (i.e., ASCII flat, positional, or delimited files) and unstructured data. Such data is analyzed so that the unstructured database (10) of the present invention may create an appropriate storage model. The present invention analyzes incoming data files such that it may be displayed in its Syntax form (i.e., records and fields identified individually). The present invention is capable of generating a storage model from syntactical metadata present in incoming data having no explicitly named structures (a partial definition of a semistructured file). Thus, syntactic information gleaned from the incoming data forms the basis for field data validation and is typically sufficient, in itself, to support the importation and use of the incoming data.

Although the present invention is capable of importing, querying and retrieving data without semantic metadata, the present invention allows the user to enter field level semantic metadata associations prior to or after data importation. Thus, individual users may utilize the file analysis application of the present invention to insert and/or update syntax or semantic metadata pertaining to each file, record, or field. This feature of the present invention provides the user with additional flexibility with regard to each data field.

The present invention is designed to allow users of nominal skill to enter field level semantic guidelines. In short, trained database administrators (DBA's) are not required to manage this aspect of data importation. The user need only have knowledge of the contents of the imported file to benefit from this aspect of the present invention.

Tokenized Symbology

Figure 3:
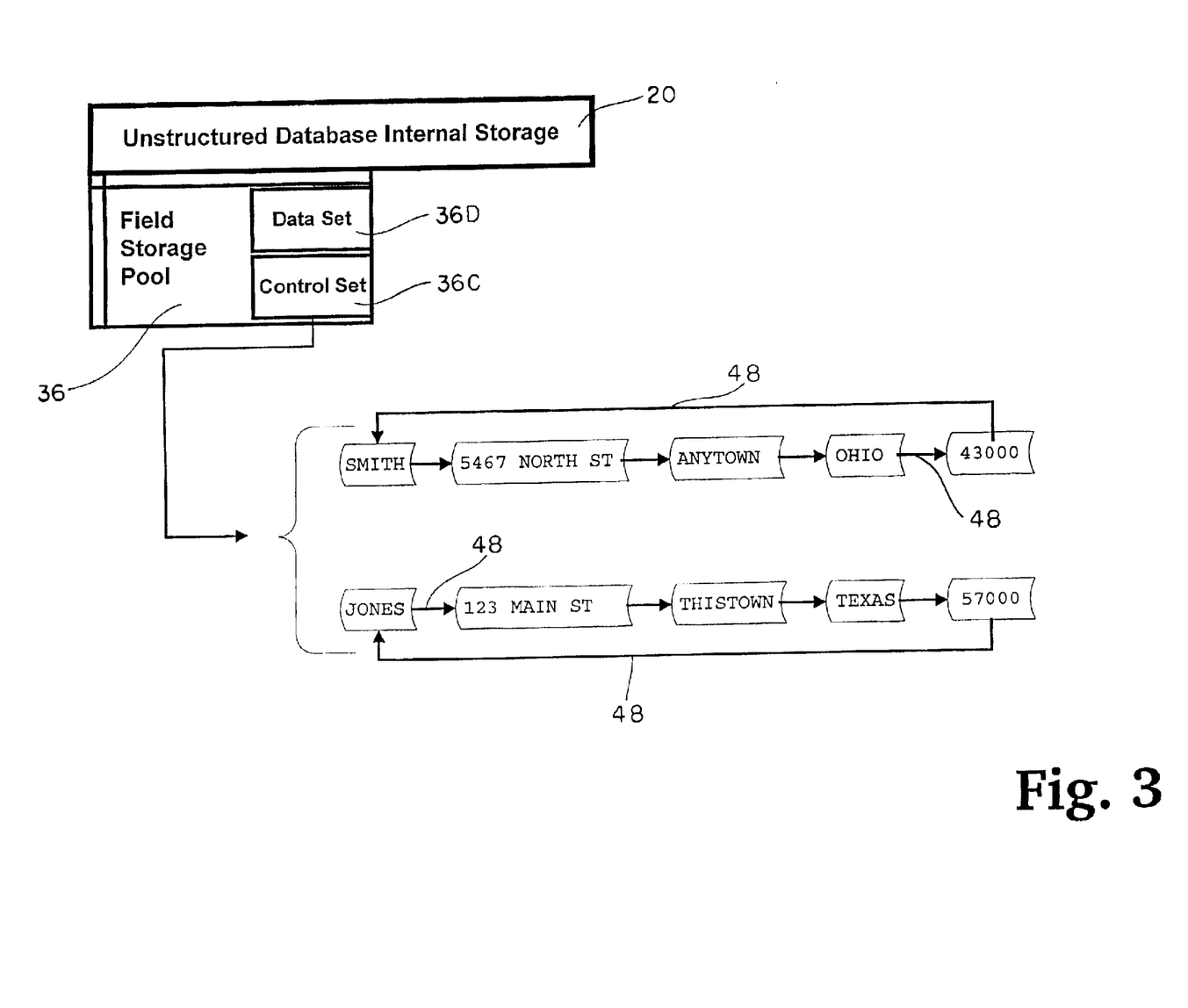
FIG. 3 is a flowchart illustrating field to record cyclical storage as used in one embodiment of the present invention.

Referring to FIG. 3, the present invention uses tokenized symbology to denote the structure of incoming data and store incoming data in the appropriate position within the internal storage device. The present invention analyzes the inherent structure of structured or semi-structured data files. Once the inherent structure of each incoming data file is determined, each data file is tokenized such that each unique record and field is defined. Once tokenized, the metadata characteristics of the incoming data is used to assign a symbolic identifier to each structural component of the data file. Thus, the data file is assigned one or more tokenized symbols capable of symbolically representing the metadata characteristics of the data.

The internal storage device of the unstructured database is then searched to reveal whether the database already contains data having the same or similar structure, i.e., data having the same or similar tokenized symbology. If a suitable match is found, the incoming data is stored along with the matching stored data having similar metadata characteristics. If no match is found, the present invention creates a storage model to match the metadata characteristics of the incoming data, which is then replicated within the database. The control type set (36C) of the field storage pool (36) contains multiple pointers. One set of pointers (48) creates the field to record cyclical storage model.

In one embodiment of the present invention, tokenized symbols contain two values. The first value of the tokenized symbol is a positional pointer (50) leading to the physical data that the symbol represents. The second value contained in the tokenized symbol is a logical pointer (48) leading to subsequent fields, records, or files (depending upon the level of the symbol). In one embodiment, the final tokenized symbol ("43000" or "57000" in FIG. 3) describing a set of fields, records, or files point back to the first symbol ("Smith" or "Jones" in FIG. 3), thus completing a cyclical storage loop. By using a series of pointers (48 and 50, respectively) within each tokenized symbol, the present invention provides for greater searching efficiency. This aspect of the present invention is referred to as field to record cyclical storage. FIG. 3 illustrates how one set of pointers may be natively associated with the tokenized symbology of each data field such that each field "points" to the subsequent field in the same manner as the record was originally imported.

Using field to record cyclical storage, the entire record associated with any located data field may be generated by following the cycle of logical pointers (48). Efficient retrieval of the data is enhanced through the use of the positional pointer (50). In a similar fashion, records can be generated for an entire file by following this unique arrangement of pointers. This feature of the present invention alleviates the need for multiple searches to locate the entire record or file associated with a given data field.

Lenses

As described above, the traditional database management system creates indexes for certain fields or groups of fields to assist the user when searching and retrieving data. When using a traditional database, data requests for data fields having no accompanying index can only be performed using time consuming row-by-row searches of the entire database. In contrast, the unstructured database (10) of the present invention produces unique indexes, hereinafter referred to as lenses, for each unique data field, thus eliminating the need to rely upon predictive indexes.

The physical processing required to generate lenses may vary by import file type. The present invention maintains a structure library to assist in identifying and importing incoming data files based upon available Metadata for each particular file type. For example, XML files are driven by a grammatical methodology. Tokenized Symbology is then used to identify the matching pairs of tags and data, and is further utilized for data capture and validation. In one embodiment, the present invention maintains a library of known data file structures such that two data files having a matching structure may utilize the identical lens regardless of the data content of each file. For example, Company A has a file that represents invoices. Although the content of each invoice is different, the structure is substantially the same. As a result, when the first Company A invoice is imported, a new lens is generated. The present invention allows subsequent imports of Company A invoices to utilize the same lens. Size and speed access issues resulting from maintaining indexes on all fields, as required in traditional database management systems, are minimized through the use of lenses composed of tokenized symbols.

In one embodiment, lenses for structured data files are designed using the inherent structure of the incoming data. In another embodiment, lenses for semi-structured and unstructured data files are designed using the file analysis capabilities of the unstructured database (10) of the present invention.

The use of tokenized symbology produces lenses that do not typically contain the physical data values in the lens but their tokenized symbols. These tokenized symbols of the field data are smaller than the data itself. By keying each search to the tokenized symbols instead of the data itself, the present invention is able to provide faster data retrieval as well as faster backup capabilities.

Storage Model

FIG. 2 illustrates an example of how data may be stored within each storage pool. Box (42) illustrates the entire file as stored within the file storage pool (32) in one embodiment of the present invention. As described above, both the physical data and its corresponding tokenized symbols may be stored as illustrated by box (42).

Box (44) illustrated each record as stored within the record storage pool (34) in one embodiment of the present invention. Both the logical record data and the tokenized symbols of the record are held within the record storage pool (34). Box (46) illustrates each filed stored within the field storage pool (36) of one embodiment of the present invention. Both the logical field data elements and their tokenized symbols may be held within the field storage pool (36).

In one embodiment of the present invention, three data storage pools are provided, each pool having two type sets. In one embodiment, the present invention is equipped with a file storage pool (32) containing control (32C) and data (32D) type sets, a record pool (34) containing control (34C) and data (34D) type sets, and a field storage pool (36) containing control (36C) and data (36D) type sets. In one embodiment, the storage pools (32, 34 and 36, respectively) and type sets (32C, 32D, 34C, 34D, 36C, and 36D, respectively) are logical entities, not physical. Under certain circumstances, storage pools and type sets may be combined or divided to further increase the efficiency of the present invention. Various factors are used to determine whether storage pools (32, 34 and 36, respectively) and/or type sets (32C, 32D, 34C, 34D, 36C, and 36D, respectively) should be combined or divided. The content of the storage pools (32, 34 and 36, respectively), the overall size of the storage pools and/or the Control type sets, and the desired performance metrics of the unstructured database environment are used to determine whether combination or division is warranted. The unstructured database of the present invention may utilize a single physical file or multiple files for data residing in each pool and type set.

Figure 4:
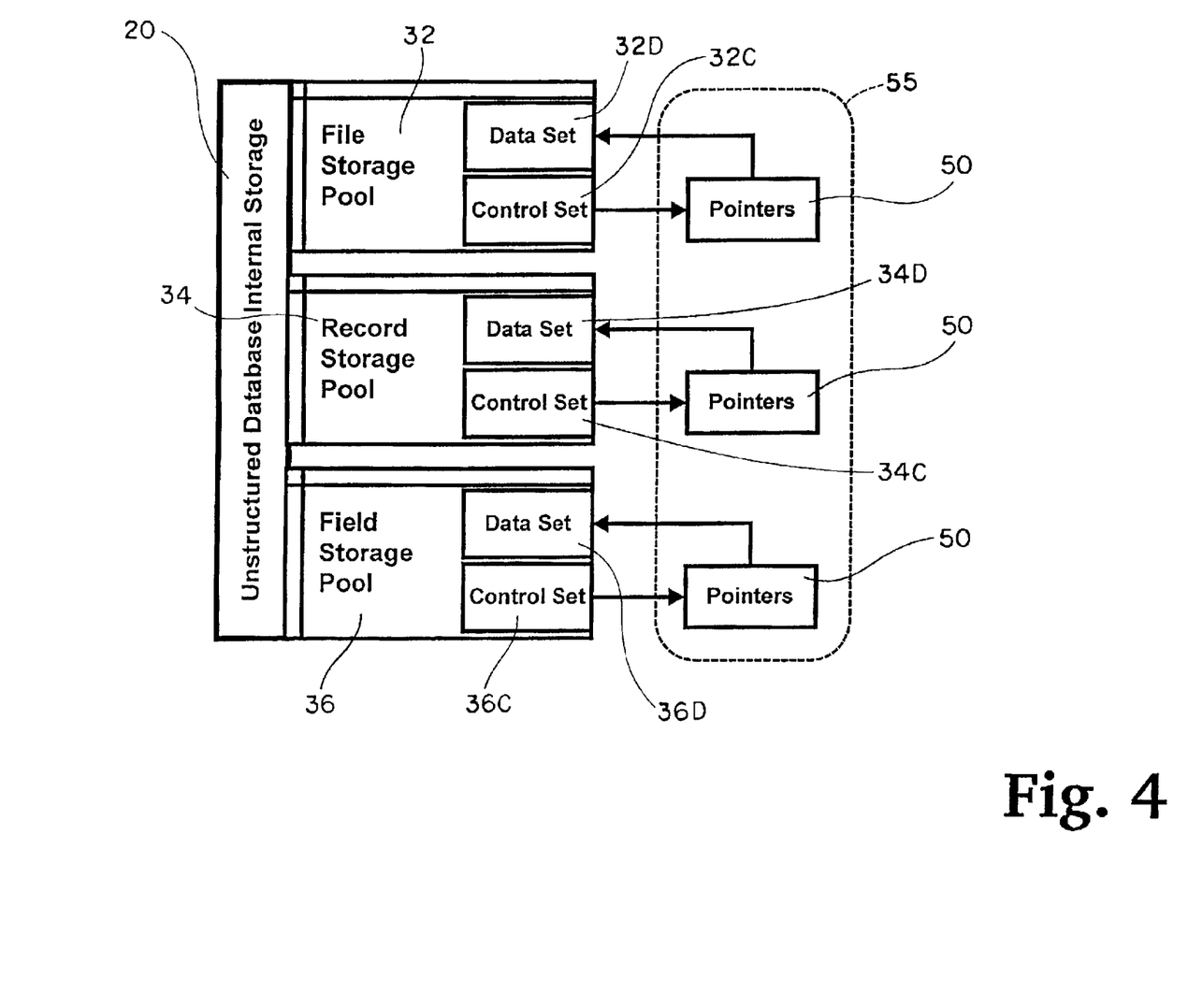
FIG. 4 is a flowchart illustrating one embodiment of the data storage model of the present invention utilizing pointers.

In one embodiment, the control type sets (32C, 34C and 36C, respectively) within each storage pool (32, 34 and 36, respectively) of the present invention contain a series of overlapping and cyclical pointers capable of referencing other pointers and ultimately the data itself. The pointers exist concurrently in more than one storage pool (32, 34 and 36, respectively) and are capable of indicating multiple sets of related data elements. To illustrate, the pointers of the present invention are capable of indicating the sequenced values of an indexed order of data. FIG. 4 illustrates the logical arrangement of each storage pool (32, 34 and 36, respectively) and its respective type set (32C, 32D, 34C, 34D, 36C and 36D, respectively). FIG. 4 illustrates the fact that each control set may contain pointers (50) linking its respective storage pool to additional storage pools. To illustrate, control sets (32C, 34C and 36C, respectively) contain arrangements of tokenized symbols (i.e. indexes) representing data held in their corresponding data sets and pointers (50) representing ordered lists of data held by these data sets. Pointers (50), regardless of which storage pool they are in, may reference other pointers in one or more storage pools as illustrated by box (55) in FIG. 4. The sequence of these pointers (50) and those pointers (50) to which they lead produce specific orderings of data that may be used to assist the user in searching for stored data.

The use of pointers (48 and 50) by the present invention allows for the repetition of access methods into physical data files without previous review of the data. Specifically, tokenized symbology allows for the generation of logical representations of each data field. In one embodiment, symbols representing various data elements are stored within control type sets (32C, 34C and 36C, respectively). The tokenized symbols may further be equipped with pointers (50) leading to associated symbols. For example, in a lens (54) sequence, associated pointers may indicate the preceding and following symbols specific to that lens's canonical order. Other associated symbols could represent different lenses (54) or the occurrence ordering of the original field, record, or file.

Once desired symbol(s) for a given query have been identified, the physical data represented by the symbols (and identified by the pointer) may be accessed. As a result, the present invention is capable of high speed responses to queries. Since the tokenized symbols are smaller than the physical data they represent, the pointers allow for faster searching on smaller sets of information. Speed is also increased due to the fact that the pointers indicate the physical location of the data, thus effectively eliminating the need for a full database scan in order to identify individual data elements.

Figure 5:
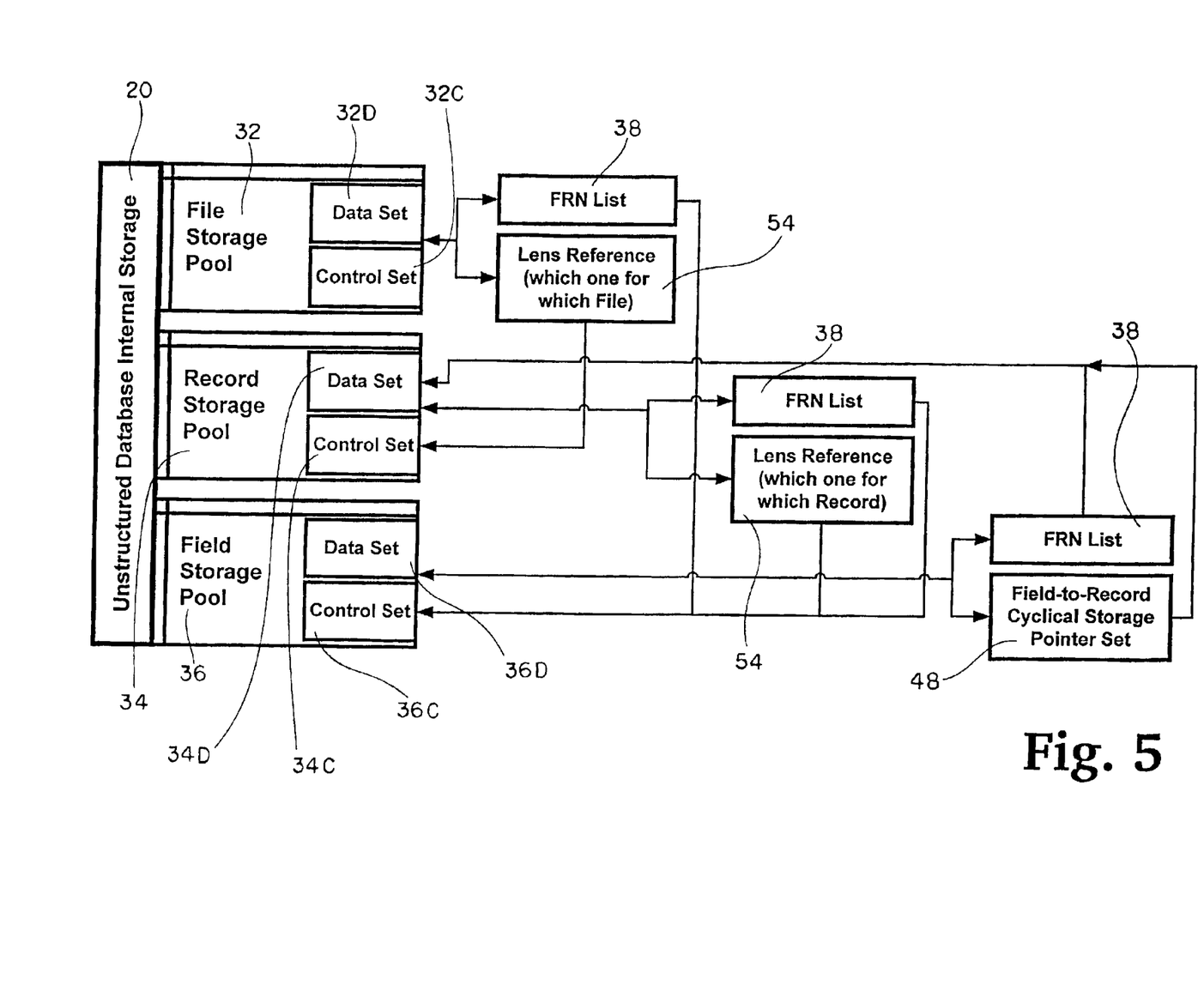
FIG. 5 is a flowchart illustrating the use of field reference numbers and lenses to manipulate stored data in one embodiment of the present invention.

Referring to FIG. 5, in one embodiment of the present invention, the file storage pool (32) contains descriptions of the source file, the order in which the records exist within the file, and the order in which files were imported into the unstructured database in relation to the other input files. The present invention maintains references to the record storage pool (34) to indicate which lenses have been applied to which input file. Additionally, lists of Field Reference Numbers (FRN's) are maintained within the file storage pool (32). In one embodiment, the FRN (38) is utilized as a logical pointer (4) leading to information block(s) containing the first field of each record of a given file. By using cyclical pointers, the file storage pool (32) of the present invention is capable of interpreting each file's records as well as associated data fields. Additionally, the file storage pool (32) is capable of processing a file in record occurrence order to comply with data file extraction requests.

In one embodiment of the present invention, the record storage pool (34) acts as the primary repository for lenses representing the tokenized symbology of incoming data files as well as the metadata associated with it. Lenses (54) are then used for input file matching, field data validation, data retrieval for queries, and data extraction for exporting out of the unstructured database (10).

Each unique file type generates one or more lenses, which may be stored an automatically selected storage pool (32, 34 and 36, respectively). In one embodiment, lenses representing files are stored within the file storage pool (32), lenses representing records are stored within the record storage pool (34), and lenses representing fields are stored within the field storage pool (36). Input files are analyzed and compared to stored lenses (54). If an existing lens matches the incoming data file, the lens is used for the incoming file and a reference to the lens is supplied to the file storage pool (32). This enables a two-way link of FRN's (38) between the file and record storage pools (32 and 34, respectively). The record storage pool (34) may also be used to process a record in field occurrence order and for record extraction.

In one embodiment of the present invention, the field storage pool (36) collects logical data file references. In some cases where the database is small, the control type set (36C) and data type sets (36D) may be merged into one type set within the field storage pool (36). This is if the tokenized symbology for a given field at this reference level is exceptionally small.

The field storage pool (36) utilizes FRNs to maintain a bidirectional communication with the record storage pool (34). This feature of the present invention allows easy identification of metadata associated with each data field. In one embodiment, the field storage pool (36) maintains a series of cyclical pointers, as well as pointers to the physical location of the data. Logically, in one embodiment, the field storage pool (36) maintains the electronic data stored within the unstructured database. The field storage pool (36) maintains and utilizes FRN lists capable of pointing the user to the record associated with a retrieved data field.

In one embodiment of the present invention, control type sets (32C, 34C and 36C, respectively) contain information specific to the storage of data elements stored in the unstructured database (10). Attributes regarding database administration and maintenance may also be stored within the control type sets (32C, 34C and 36C, respectively). The control type sets do not contain actual data (fields, records, or files) but instead comprise tokenized symbols. Accordingly, the control type sets (32C, 34C and 36C, respectively) are substantially smaller than the data itself. Although smaller than the data itself, the tokenized symbols in the control sets retain the ability to reference actual data held in the data type sets.

In addition to tokenized symbology, control type sets (32C, 34C, and 36C, respectively) may also maintain ordered lists of information that effectively form the lenses for each field, record, and file depending upon the storage pool (32, 34 and 36, respectively) at issue.

In one embodiment of the present invention, data type sets (32D, 34D, and 36D, respectively) are logical entities containing actual electronic data (field, record, or file) from the incoming data file. In another embodiment, the physical storage of data is performed by writing the file's contents in sequential order such that the data is not parsed or broken into smaller components. However, the present invention allows the data to be compressed using a non-proprietary compression algorithm.

In one embodiment of the present invention, memory mapping techniques are utilized to further increase processing speed. By exploiting the pointer methodology described above and the exceptionally small size of the control type sets as compared to the original data, the pointers can be mapped into high-speed Random Access Memory (RAM and its variants) rather than substantially slower Direct Access Storage Device (DASD) media. The effect is achieved when, after startup, the pointers are loaded into the computer's primary memory store. There the pointers are capable of performing the identical function but on media that can be hundreds of times faster than DASD.

Figure 6:
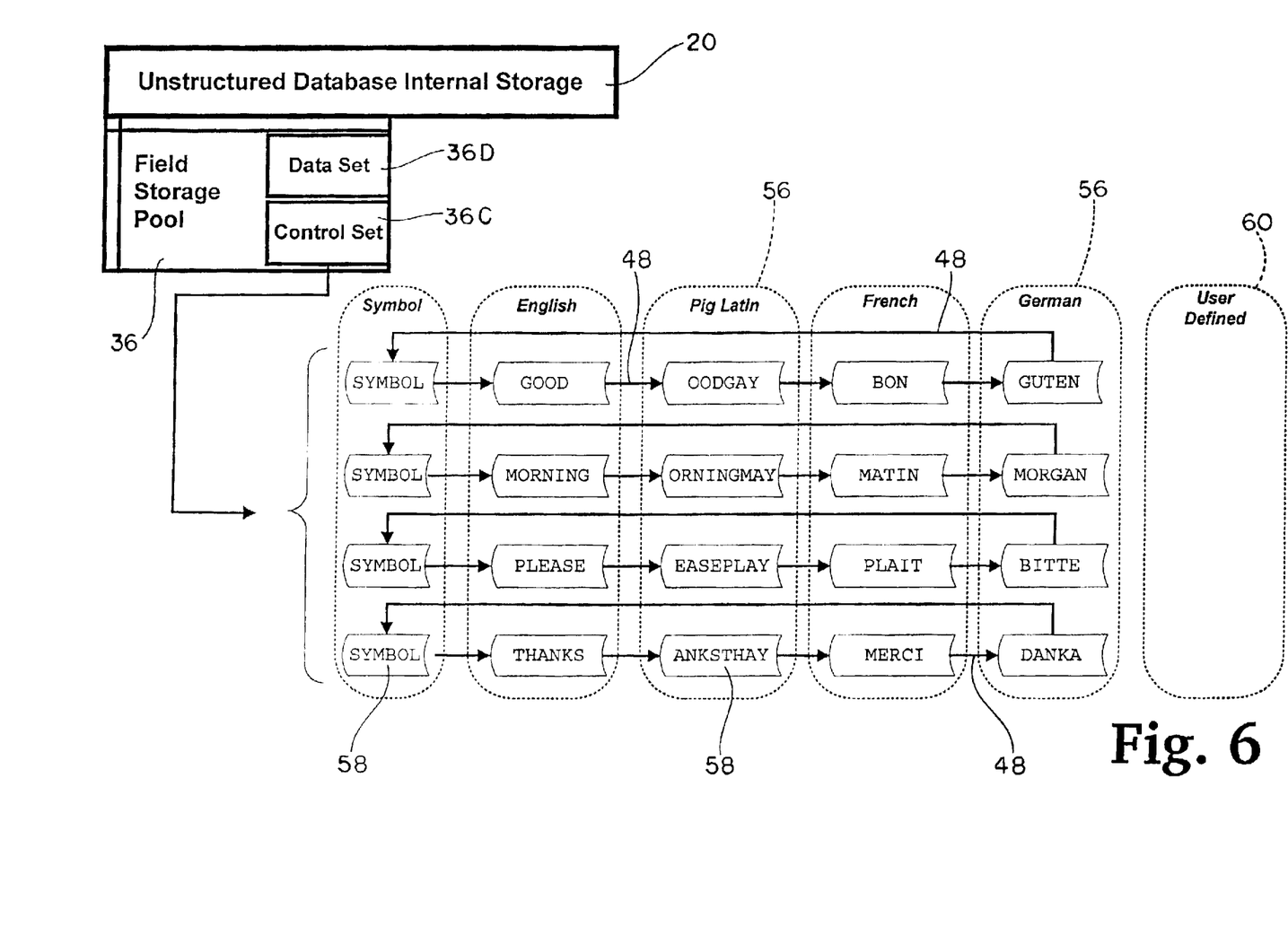
FIG. 6 is a flowchart illustrating the translation process of one embodiment of the present invention.

Referring to FIG. 6, the inherent internal translation feature of the unstructured database of the present invention allows search queries in a variety of languages. Specifically, the present invention is capable of translating user search queries into the applicable tokenized symbology such that the system may conduct searches for matching symbology. To accomplish this, the internal storage device (20) of the unstructured database (10) of the present invention is equipped with a pre-populated collection of fields (56) and terms (58) used to translate user queries into tokenized symbols. The field to record cyclical storage process is used, as illustrated in FIG. 6, to allow user queries to be translated. To provide further flexibility, the present invention is capable of translating mixed queries such as "good orning-may" or "plait danka". The present invention also provides user-definable language enhancement abilities (60) allowing a user to add new query functions or language dialects established by different vendors.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method of storing, maintaining and distributing computer intelligible electronic data comprising the steps of:
   providing a storage device capable of storing electronic data, said storage device containing a first set of electronic data;
   accessing said first set of electronic data;
   analyzing said first set of data to determine a structure associated with said first set of data;
   tokenizing said first set of data;
   assigning a first plurality of tokenized symbolic identifiers to said first set of data based upon said structure of said first set of data;
   accessing a second set of electronic data;
   analyzing said second set of data to determine a structure associated with said second set of data;
   tokenizing said second set of data;
   assigning a second plurality of tokenized symbolic identifiers to said second set of data based upon said structure of said second set of data;
   comparing said second plurality of identifiers to said first plurality of identifiers;
   if said second plurality of identifiers substantially matches said first plurality of identifiers, storing said second set of data within a first data storage structure on said storage device;
   if said second plurality of identifiers does not substantially match said first plurality of identifiers, creating a second data storage structure within said storage device; and
   storing said second set of data within said second storage structure of said storage device.

2. The method of claim 1, further comprising the step of:
   upon creation of said second data storage structure, compiling a second collection of tokenized symbolic identifiers for use in searching and extracting said second set of electronic data.

3. A computer readable medium comprising a plurality of instructions for storing, maintaining and distributing computer intelligible electronic data which, when read by a computer system having a storage device capable of storing electronic data, causes the computer to perform the steps of:
   accessing a first set of electronic data stored upon said storage device;
   analyzing said first set of data to determine a structure associated with said first set of data;
   tokenizing said first set of data;
   assigning a first plurality of tokenized symbolic identifiers to said first set of data based upon said structure of said first set of data;
   accessing a second set of electronic data;
   analyzing said second set of data to determine a structure associated with said second set of data;
   tokenizing said second set of data;
   assigning a second plurality of tokenized symbolic identifiers to said second set of data based upon said structure of said second set of data;
   comparing said second plurality of identifiers to said first plurality of identifiers;
   if said second plurality of identifiers substantially matches said first plurality of identifiers, storing said second set of data within a first data storage structure on said storage device;
   if said second plurality of identifiers does not substantially match said first plurality of identifiers, creating a second data storage structure within said storage device; and
   storing said second set of data within said second storage structure.

4. The computer readable medium of claim 3, wherein said plurality of instructions causes the computer to perform the additional step of:
   upon creation of said second data storage structure, compiling a second collection of tokenized symbolic identifiers for use in searching and extracting said second set of electronic data.

5. A computer system for storing, maintaining and distributing computer intelligible electronic data comprising:
   a storage device capable of storing electronic data, said storage device containing a first set of electronic data;
   a processing unit, coupled to said storage device, for accessing said first set of electronic data, for analyzing said first set of data to determine a structure associated with said first set of data, for tokenizing said first set of data, and for assigning a first plurality of tokenized symbolic identifiers to said first set of data based upon said structure of said first set of data;
   wherein said processing unit is further defined as being capable of accessing a second set of electronic data, analyzing said second set of data to determine a structure associated with said second set of data, tokenizing said second set of data, assigning a second plurality of tokenized symbolic identifiers to said second set of data based upon said structure of said second set of data, comparing said second plurality of identifiers to said first plurality of symbolic identifiers and, if said second plurality of identifiers substantially matches said first plurality of identifiers, storing said second set of data within a first data storage structure on said storage device; and
   wherein said processing unit is further defined as being capable of, if said second plurality of identifiers does not substantially match said first plurality of identifiers, creating a second data storage structure within said storage device and storing said second set of data within said second storage structure of said storage device.

6. The computer system of claim 5, wherein said processing unit is further defined as being capable of, upon creation of said second storage structure, compiling a second collection of tokenized symbolic identifiers for use in searching and extracting said second set of electronic data.

* * * * *